(12) United States Patent
Chappaz

(10) Patent No.: US 8,699,981 B2
(45) Date of Patent: Apr. 15, 2014

(54) RECEIVER

(75) Inventor: David Chappaz, Milton (GB)

(73) Assignee: Cambridge Silicon Radio Limited, Cambridge (GB)

( * ) Notice: Subject to any disclaimer, the term of this patent is extended or adjusted under 35 U.S.C. 154(b) by 353 days.

(21) Appl. No.: 12/934,189

(22) PCT Filed: May 29, 2009

(86) PCT No.: PCT/EP2009/056651
§ 371 (c)(1),
(2), (4) Date: Feb. 1, 2011

(87) PCT Pub. No.: WO2009/147108
PCT Pub. Date: Dec. 10, 2009

(65) Prior Publication Data
US 2011/0159830 A1 Jun. 30, 2011

(30) Foreign Application Priority Data
Jun. 2, 2008 (GB) .................................. 0810047.1

(51) Int. Cl.
*H04W 24/00* (2009.01)

(52) U.S. Cl.
USPC .................... 455/226.1; 375/260; 375/346

(58) Field of Classification Search
USPC ............ 455/63.1, 67.11, 226.1, 226.3, 232.1, 455/295, 296; 375/148, 260, 346, 348, 349, 375/146, 147
See application file for complete search history.

(56) References Cited

U.S. PATENT DOCUMENTS

| 2007/0211790 A1* | 9/2007 | Agrawal et al. ............... 375/147 |
| 2009/0046792 A1* | 2/2009 | Xu et al. ........................ 375/260 |
| 2009/0116567 A1* | 5/2009 | Chen et al. .................... 375/260 |

OTHER PUBLICATIONS

Stephen E. Bensley et al., "*Subspace-Based Channel Estimation for Code Division Multiple Access Communication Systems*", IEEE Transactions on Communications, vol. 44, No. 8, Aug. 1, 1996, ISSN: 0090-6778, abstract, Sections I-V.

Fu Li et al., "*On Channel Estimation for Rake Receiver in a Mobile Multipatch Fading Channel*", Proceedings of the International Conference on Acoustics, Speech, and Signal Processing (ICASSP), vol. iv, Apr. 19-22, 1994; pp. IV/577-IV/580, ISBN: 978-0-7803-1775-8, abstract, Sections 1-6.

Gregory E. Bottomley et al., "*Rake Reception with Channel Estimation Error*", IEEE Transactions on Vehicular Technology, vol. 55, No. 6, Nov. 1, 2006, pp. 1923-1926, ISSN: -0018-9545; abstract, Sections I-V.

Latva-Aho M et al., *Reconfigurable Adaptive Rake Receiver for Wideband CDMA Systems*, 48th IEEE Vehicular Technology Conference (VTC 98), vol. 3, May 18-21, 1998, pp. 1740-1744, ISBN: 978-0-7803-4320-7, abstract, I-IV.

\* cited by examiner

*Primary Examiner* — Thanh Le
(74) *Attorney, Agent, or Firm* — RatnerPrestia

(57) ABSTRACT

A receiver (10) for a telecommunications system, the receiver (10) comprising a channel impulse response estimator (12) for producing an initial estimated channel impulse response of an overall multipath channel of the telecommunications system and a processing unit (16) for calculating, from the initial estimated channel impulse response, an estimate of the gain of each component of a propagation channel impulse response represented by the initial estimated channel impulse response.

15 Claims, 5 Drawing Sheets

RECEIVER

REFERENCE TO RELATED APPLICATION

The present application is the U.S. national phase of PCT International Patent Application No. PCT/EP2009/056651, filed May 26, 2009, published on Dec. 10, 2009, as WO 2009/147108 A1, which claims the benefit of U.K. Patent Application No. GB/0810047.1, filed Jun. 2, 2008, whose disclosures are hereby incorporated by reference in their entirety into the present disclosure.

The present invention relates to a receiver for a telecommunications system, and to a method of producing an estimate of a propagation channel impulse response for a multipath propagation channel of a telecommunications system.

DESCRIPTION OF RELATED ART

In telecommunications systems which operate in multipath environments, such as mobile telecommunications systems operating under the GSM or 3GPP standards, it is commonplace for a receiver to use a channel estimator to estimate the overall channel impulse response of a channel linking the receiver and a transmitter. This estimated channel impulse response can be used to determine complex gain estimates for the "rays" of a multipath propagation channel which can in turn be used to configure a rake receiver architecture to counteract the multipath effects introduced by the propagation channel to aid in the accurate reception of a transmitted signal.

Typically the propagation channel impulse response comprises a plurality of complex gains (known as "rays") occurring at different points in time, each complex gain representing a different propagation path that can be taken by a transmitted signal in reaching the receiver. Each different propagation path attenuates the transmitted signal. An exemplary channel impulse response of a multipath propagation channel is shown in FIG. 1.

In many telecommunications systems transmit and/or receive filters are employed in the transmitter and/or receiver to shape transmitted and received signals. An effect of these filters is to cause the rays of the propagation channel impulse response to "spread out", due to the convolution of the filter transfer functions with the propagation channel impulse response. If adjacent rays of the propagation channel impulse response are closely spaced in time, i.e. there is only a short delay between them, adjacent rays can overlap each other due to this spreading effect, which makes it difficult accurately to identify rays and to calculate the complex gain associated with each ray.

A simple example of this is shown in FIG. 2. In FIG. 2, a propagation channel impulse response comprises two rays, having complex gains $g_0$ and $g_1$ respectively. The transmit and receive filters used in the transmitter and receiver of the telecommunications system can be modelled as a single filter having a transfer function $f(t)$. The combined effect of the transmit and receive filters is applied to all of the rays of the propagation channel impulse response, such that for each ray the channel estimator "sees" the complex gains of the "true" channel impulse response as affected by the transmit and receive filter. Thus, the channel estimator generates an estimate of the overall channel impulse response, including the contributions of the transmit and receive filters.

In the example illustrated in FIG. 2, the first ray of the propagation channel impulse response has a complex gain $g_0$. However, as the second ray of the propagation channel impulse response is close to the first ray (i.e. there is a small time delay between the first and second rays), the second ray partially obscures the first ray, because of the overlap caused by the effect of the transmit and receive filters.

This problem may be exacerbated in environments where there are more than two signal paths, as rays may overlap with more than one adjacent ray due to the spreading effect caused by the transmit and receive filters.

It will be appreciated that the channel estimator generates an estimate of the overall channel impulse response of the transmit/receive system, which is affected by the transmit and receive filters in the transmitter and receiver. On the other hand, the propagation channel impulse response is not affected by the transmit and receive filters, but rather is a measure of the effect of the multipath propagation channel alone on a transmitted signal. The overall channel impulse response is continuous, whereas the propagation channel impulse response is discrete, comprising a number of rays. In the following description, the term "channel impulse response" is used to refer to the overall channel impulse response, as affected by the transmit and receive filters, whilst the term "propagation channel impulse response" is used to refer to the channel impulse response of the propagation channel alone.

SUMMARY OF THE INVENTION

According to a first aspect of the invention, there is provided receiver for a telecommunications system, the receiver comprising a channel impulse response estimator for producing an initial estimated channel impulse response of an overall multipath channel of the telecommunications system and a processing unit for calculating, from the initial estimated channel impulse response, an estimate of the gain of each component of a propagation channel impulse response represented by the initial estimated channel impulse response.

The receiver of the present invention enables more accurate calculation of the complex gains of the channel impulse response of the propagation channel, which in turn leads to a better rake receiver configuration and thus more accurate and reliable reception of transmitted signals.

The receiver may further comprise a finger management unit for determining positions in time of multipath components within the initial estimated channel impulse response.

The channel estimator may be configured to produce samples of the initial estimated channel impulse response.

The processing unit may be configured to solve a matrix equation relating the propagation channel impulse response to the initial estimated channel impulse response.

The processing unit may be configured to construct the matrix equation.

Preferably the processing unit is configured to solve the matrix equation using a minimum square error technique.

The finger management unit may comprise a peak detector.

According to a second aspect of the invention there is provided a method of producing a channel impulse response estimate for a multipath propagation channel of a telecommunications system, the method comprising producing an initial estimate of an overall channel impulse response of the multipath channel of the telecommunications system and calculating, from the initial estimated channel impulse response, an estimate of the gain of each component of the propagation channel impulse response represented by the initial estimated channel impulse response.

The method may further comprise determining positions in time of multipath components within the initial estimated channel impulse response.

Producing the initial estimated channel impulse response may comprise producing samples of the initial estimated channel impulse response.

Calculating the estimate of the gain of each component of the propagation channel impulse response may comprise solving a matrix equation relating the propagation channel impulse response to the initial estimated channel impulse response.

Calculating the estimate of the gain of each component of the propagation channel impulse response may comprise constructing the matrix equation.

Preferably the matrix equation is solved using a minimum square error technique.

Determining positions in time of multipath components within the initial estimated channel impulse response may comprise performing a peak detection on the estimated channel impulse response.

According to a third aspect of the invention there is provided a computer program for performing the method of the second aspect.

BRIEF DESCRIPTION OF THE DRAWINGS

Embodiments of the invention will now be described, strictly by way of example only, with reference to the accompanying drawings, of which.

DETAILED DESCRIPTION OF THE PREFERRED EMBODIMENTS

Figure 3:
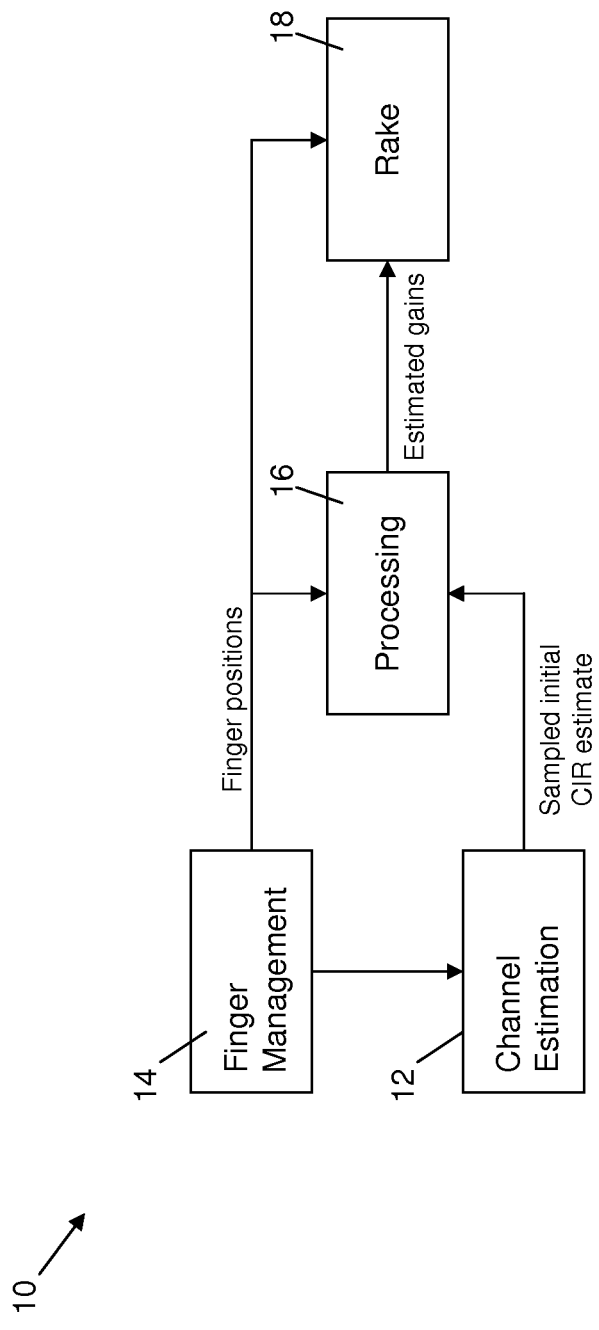
FIG. 3 is a schematic representation of an architecture of a receiver according to the present invention.

Referring firstly to FIG. 3, a receiver according to the present invention is illustrated schematically at 10. It will be appreciated that the functional blocks shown in FIG. 3 do not necessarily represent actual components of a practical implementation of a receiver 10, but are rather intended to illustrate functions carried out by the receiver 10.

The receiver 10 comprises a channel estimator 12 which produces an initial estimate of a channel impulse response of an overall channel in which the receiver is operating, and a finger management unit 14 for determining positions in time of multipath components within the estimated channel impulse response. The finger management unit 14 may be, for example, a peak detector which detects peaks in the estimated channel impulse response and records the time (or time offset) at which those peaks occur to determine the positions in time of the multipath components.

The initial estimated channel impulse response is produced as samples, and these samples, together with the positions of the multipath components, are input to a processing unit 16 such as a microprocessor, FPGA or DSP, which produces and solves a mathematical model relating the complex gain of each multipath component of a channel impulse response of the propagation channel alone to the initial estimated channel impulse response, so as to produce a propagation channel impulse response estimate which can be used to configure a rake receiver 18.

The channel estimator 12 produces samples of the overall channel impulse response of the channel in which the receiver 10 is operating. These samples are taken at discrete points in time, and reflect the channel impulse response as measured by the channel estimator at those points in time. However, as is explained above, transmit and/or receive filters used in a transmitter and/or the receiver can cause distortion of the propagation channel impulse response, as different components (rays) of the propagation channel impulse response "spread" or overlap each other.

Figure 1:
FIG. 1 is a schematic representation of an exemplary propagation channel impulse response.
Figure 2:
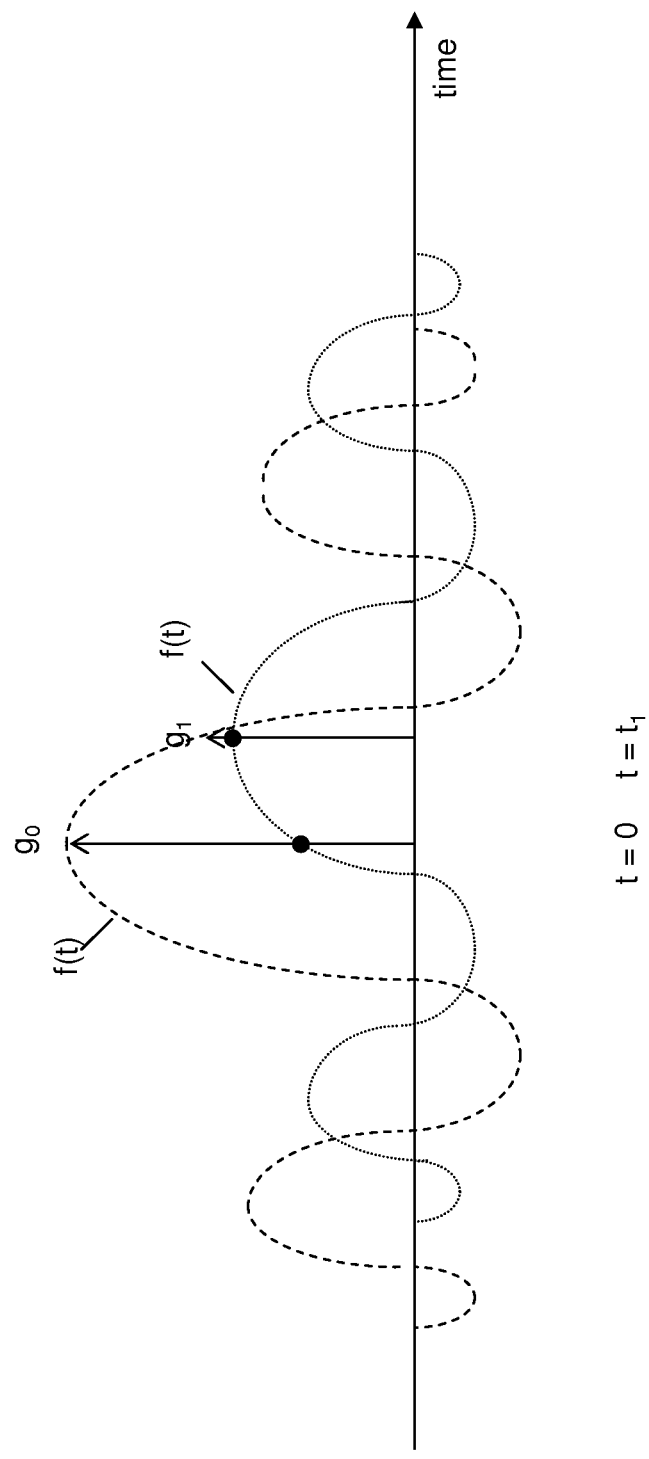
FIG. 2 is a schematic representation of a propagation channel impulse response which has been affected by spreading caused by a transmit filter and/or a receive filter.

In the example shown in FIG. 2, the channel impulse response is sampled at time points $t=0$ and $t=t_1$, which in this example coincide with the positions in time of the first and second components (rays) of the propagation channel impulse response.

At time $t=0$, the gain of the propagation channel impulse response is equal to $g_0$ (i.e. the first component of the propagation channel impulse response). However, the overall channel impulse response "seen" by the receiver 10 is affected by the second component of the propagation channel impulse response, due to the spreading effect caused by transmit and/or receive filters.

Thus, the channel impulse response sample h(t) which is produced by the channel estimator for a time $t=0$ is given by the equation:

$$h(0)=g_0 f(0)+g_1 f(-t_1) \quad (1),$$

where f(t) is the cumulative transfer function of the transmit and/or receive filters used in the transmitter and/or receiver.

Similarly, the channel impulse response h(t) which is produced by the channel estimator for a time $t=t_1$ is influenced by the first and second components of the propagation channel impulse response and the combined transmit and receive filters, as is described by the equation below:

$$h(t_1)=g_0 f(t_1)+g_1 f(0) \quad (2)$$

Thus the propagation channel impulse response at times $t=0$ and $t=t_1$ cannot be measured and must be calculated from the measured estimated channel impulse response.

Typically f(t), the cumulative transfer function of the transmit and receive filters can be calculated, as the properties of the transmit and receive filters are defined in the specifications of telecommunications standards such as UMTS, and thus the values $f(t_1)$ and $f(t_0)$ can be calculated by the processing unit 16. $h(0)$ and $h(t_1)$ are the sample values produced by the channel estimator 12. Thus the only unknown quantities in equations (1) and (2) above are the gains $g_0$, $g_1$ of the propagation channel impulse response. In other words the equations (1) and (2) form a system of simultaneous equations.

In order to calculate the gains $g_0$ and $g_1$ of the rays constituting the propagation channel impulse response, the processing unit 16 constructs a matrix equation from the simultaneous equations, as follows:

$$\begin{bmatrix} h_0 \\ h_1 \end{bmatrix} = \begin{bmatrix} f(0) & f(-t_1) \\ f(t_1) & f(0) \end{bmatrix} \cdot \begin{bmatrix} g_0 \\ g_1 \end{bmatrix}, \text{ or } h = M \cdot g$$

The processing unit 16 calculates the inverse matrix $M^{-1}$ so as to calculate the vector g, thus calculating the gains of the rays constituting the propagation channel impulse response at time $t=0$ and time $t=t_1$, and these values are used to configure the rake receiver 18. In this way, the configuration of the rake 18 more closely matches the propagation channel, thus leading to more accurate decoding of received signals.

It will be appreciated that the example presented above is greatly simplified, and in practice it is possible that the samples produced by the channel estimator will not coincide exactly with the positions in time of components of the propagation channel impulse response. Indeed, the channel estimator 12 typically oversamples the estimated channel impulse response, thus producing more samples than there are components (rays) of the propagation channel impulse response.

Figure 4:
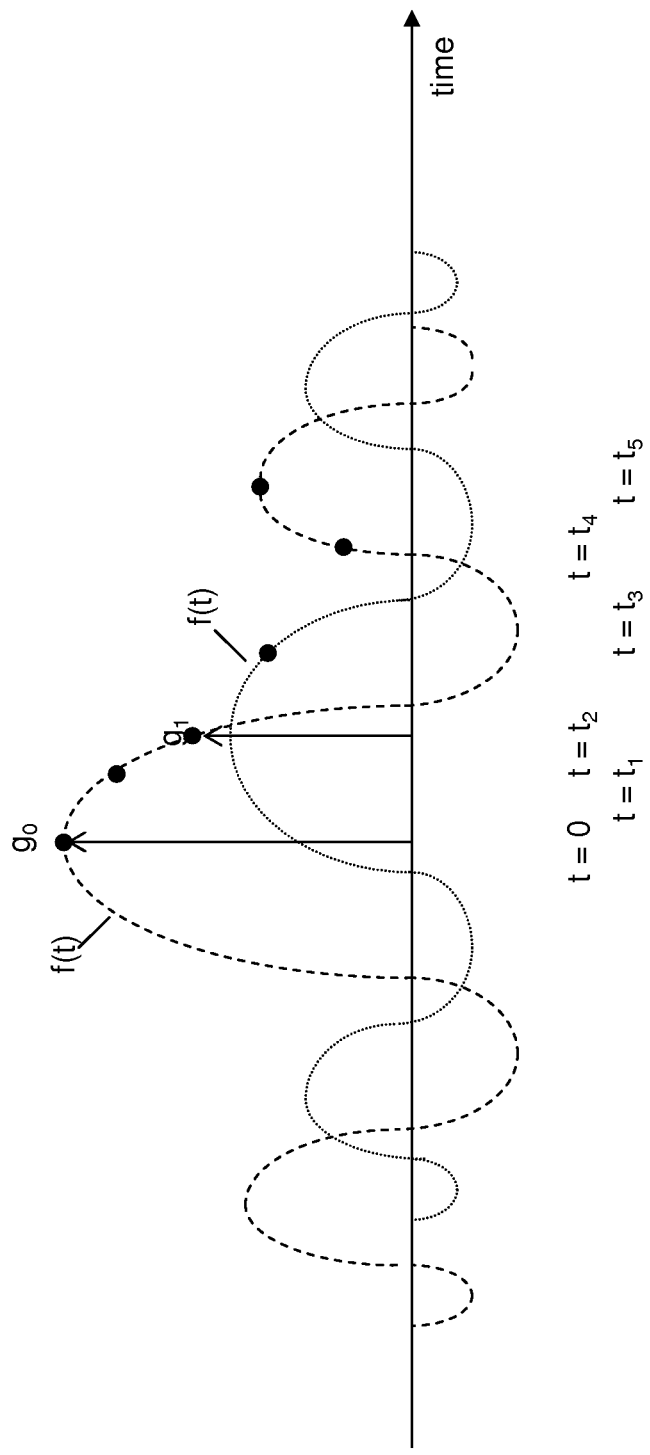
FIG. 4 shows an oversampled version of the channel impulse response of FIG. 2.

In the example shown in FIG. 4, the channel impulse response of FIG. 2 has been sampled at times $t=0$, $t=t_1$, $t=t_2$, $t=t_3$, $t=t_4$ and $t=t_5$. In this example there are only two components in the estimated channel impulse response, but it will be appreciated that in practice the initial estimated channel impulse response is likely to have more multipath components. As in the previous example, the gains $g_0$ and $g_1$ of the multipath components of the propagation channel impulse response are unknown.

The values $h(0)$ to $h(t_5)$ of the initial estimated channel impulse response sampled by the channel estimator at times $t=0$ to $t=t_5$ are given by:

$$h(0)=g_0 f(0)+g_1 f(-t_2)$$

$$h(t_1)=g_0 f(t_1)+g_1 f(-t_2+t_1)$$

$$h(t_2)=g_0 f(t_2)+g_1 f(0)$$

$$h(t_3)=g_0 f(t_3)+g_1 f(-t_2+t_3)$$

$$h(t_4)=g_0 f(t_4)+g_1 f(-t_2+t_4)$$

$$h(t_5)=g_0 f(t_5)+g_1 f(-t_2+t_5)$$

These simultaneous equations are converted into a matrix equation of the form $h=M \cdot g$ by the processing unit 16, giving:

$$\begin{bmatrix} h(0) \\ h(t_1) \\ h(t_2) \\ h(t_3) \\ h(t_4) \\ h(t_5) \end{bmatrix} = \begin{bmatrix} f(0) & f(-t_2) \\ f(t_1) & f(-t_2+t_1) \\ f(t_2) & f(0) \\ f(t_3) & f(-t_2+t_3) \\ f(t_4) & f(-t_2+t_4) \\ f(t_5) & f(-t_2+t_5) \end{bmatrix} \cdot \begin{bmatrix} g_0 \\ g_1 \end{bmatrix}$$

As the matrix M is not a square matrix, the inverse matrix $M^{-1}$ cannot be calculated for the above equation. Instead, the processing unit 16 calculates the pseudo inverse matrix $M^{\#}$, and uses this to solve the system of equations above for $g_0$ and $g_1$. Because there are more equations than there are unknowns in the above system, the values $g_0$ and $g_1$ cannot be calculated exactly. Instead, the processing unit solves for $g_0$ and $g_1$ in a minimum square error sense, using techniques which will be familiar to those skilled in the art. This gives a best fit for the gains $g_0$ and $g_1$ of the multipath components of the propagation channel impulse response.

The processing unit 16 produces a matrix equation with a matrix M having as many rows as there are samples of the estimated channel impulse response. In the above example the channel estimator produces six samples, and the matrix M has six rows. Each column of the matrix M corresponds to a different component (ray) of the propagation channel impulse response, and thus to a different finger of the rake receiver 18. It will be appreciated by those skilled in the art that increasing the number of samples of the initial estimated channel impulse response taken by the channel estimator 12 increases the accuracy of the gains calculated by the processing unit 16 for the components of the propagation channel impulse response. It will also be noted that where the number of samples taken is equal to the number of multipath components in the propagation channel impulse response (i.e. only a single sample is taken per component), the matrix M is a square matrix and thus the inverse matrix $M^{-1}$ can be calculated by the processing unit 16, allowing the gains g to be calculated exactly. In this situation, the inverse matrix $M^{-1}$ is equal to the pseudo inverse matrix $M^{\#}$, and thus the approach of calculating the pseudo inverse matrix $M^{\#}$ can be maintained in these circumstances. However, the multipath gains calculated in such a manner are likely to be less accurate than the best fit gains calculated where there are more samples of the estimated channel impulse response than there are multipath components of the propagation channel impulse response.

The receiver 10 can be optimised in a number of ways. For example, if the initial estimated channel impulse response contains a component which is spaced a large distance from the nearest adjacent component (i.e. there is a large delay between the component and its nearest neighbour), that component is likely to have a very small effect on other multipath components in the initial estimated channel impulse response, and thus can be ignored by the processing unit 16 in constructing and solving the matrix equation system, thus reducing the number of calculations that the processing unit 16 is required to perform.

Figure 5:
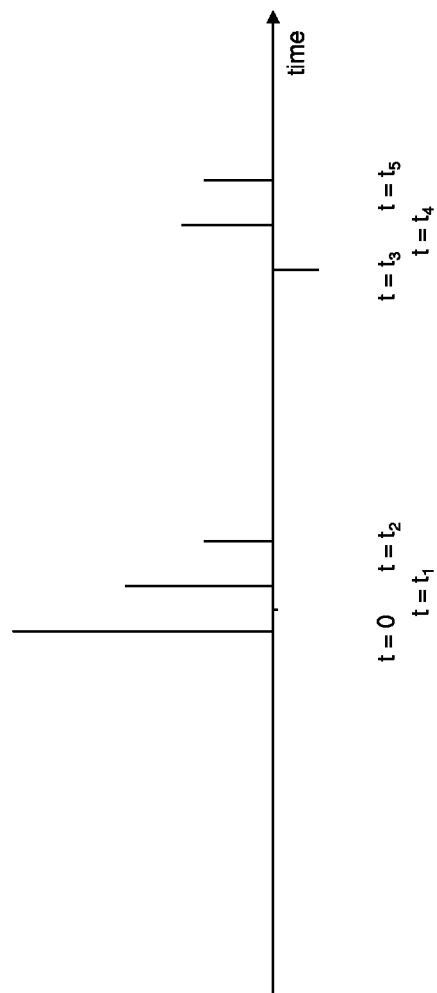
FIG. 5 is a schematic representation of a propagation channel impulse response in which multi-path components form two spaced clusters.

Similarly, if the estimated channel impulse response contains "clusters" of components, with each cluster being spaced from the others (as is illustrated in FIG. 5), the effect of the components of one cluster on those of another cluster is likely to be minimal, and thus the gains of the components of each cluster can be calculated separately, disregarding the effects of components belonging to other clusters. Thus, in the exemplary initial channel impulse response estimate of FIG. 5, the gains of the components occurring a times $t=0$, $t=t_1$ and $t=t_2$ can be calculated independently of the gains of the components occurring at times $t=t_3$, $t=t_4$ and $t=t_5$.

The receiver 10 can be implemented in hardware using discrete components or suitably configured integrated circuits. Alternatively, the receiver 10 can be implemented using a suitable instruction set running on a microprocessor, FPGA, DSP or the like.

The invention claimed is:

1. A receiver for a telecommunications system, the receiver comprising a channel impulse response estimator for producing an initial estimated channel impulse response of an overall multipath channel of the telecommunications system, wherein the initial estimated channel impulse response of the overall multipath channel is affected by a receive filter of the receiver and by a transmit filter of a transmitter of the telecommunications system, and a processor configured to calculate, from the initial estimated channel impulse response, an estimate of the gain of each component of a propagation channel impulse response represented by the initial estimated channel impulse response, wherein the propagation channel impulse response is not affected by the transmit or receive filters.

2. A receiver according to claim 1 further comprising a finger management unit for determining positions in time of multipath components within the initial estimated channel impulse response.

3. A receiver according to claim 2 wherein the finger management unit comprises a peak detector.

4. A receiver according to claim 1 wherein the channel estimator is configured to produce samples of the initial estimated channel impulse response.

5. A receiver according to claim 1 wherein the processing unit is configured to solve a matrix equation expressing a mathematical model relating the gains of the multipath components of the propagation channel impulse response to the initial estimated channel impulse response.

6. A receiver according to claim 5 wherein the processing unit is configured to produce the matrix equation.

7. A receiver according to claim 5 wherein the processing unit is configured to solve the matrix equation using a minimum square error technique.

8. A method of producing a channel impulse response estimate for a propagation channel of a telecommunications system, the method comprising producing an initial estimate of an overall channel impulse response of the multipath channel of the telecommunications system, wherein the initial estimated channel impulse response of the overall multipath channel is affected by a receive filter of a receiver of the telecommunications system and by a transmit filter of a transmitter of the telecommunications system, and calculating, from the initial estimated channel impulse response, an estimate of the gain of each component of the propagation channel impulse response represented by the initial estimated channel impulse response, wherein the propagation channel impulse response is not affected by the transmit or receive filters.

9. A method according to claim 8 further comprising determining positions in time of multipath components within the initial estimated channel impulse response.

10. A method according to claim 8 wherein producing the initial estimated channel impulse response comprises producing samples of the initial estimated channel impulse response.

11. A method according to claim 10 wherein determining positions in time of multipath components within the estimated channel impulse response comprises performing a peak detection on the estimated channel impulse response.

12. A method according to claim 8 wherein calculating the estimate of the gain of each component of the propagation channel impulse response comprises solving a matrix equation expressing a mathematical model relating the propagation channel impulse response to the estimated channel impulse response.

13. A method according to claim 12 wherein calculating the estimate of the gain of each component of the propagation channel impulse response comprises producing the matrix equation.

14. A method according to claim 12 wherein the matrix equation is solved using a minimum square error technique.

15. A non-transitory computer-readable medium including a computer program, which, when executed by a processor, causes the processor to perform a method of producing a channel impulse response estimate for a propagation channel of a telecommunications system, the method comprising producing an initial estimate of an overall channel impulse response of the multipath channel of the telecommunications system, wherein the initial estimated channel impulse response of the overall multipath channel is affected by a receive filter of a receiver of the telecommunications system and by a transmit filter of a transmitter of the telecommunications system, and calculating, from the initial estimated channel impulse response, an estimate of the gain of each component of the propagation channel impulse response represented by the initial estimated channel impulse response, wherein the propagation channel impulse response is not affected by the transmit or receive filters.

* * * * *